(12) United States Patent
Cunningham et al.

(10) Patent No.: US 9,147,373 B2
(45) Date of Patent: Sep. 29, 2015

(54) TRANSPARENT EFFICIENCY FOR IN-MEMORY EXECUTION OF MAP REDUCE JOB SEQUENCES

(75) Inventors: David Cunningham, Ossining, NY (US); Benjamin W. Herta, Poughquag, NY (US); Vijay A. Saraswat, Mahopac, NY (US); Avraham E. Shinnar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/594,788

(22) Filed: Aug. 25, 2012

(65) Prior Publication Data
US 2014/0055496 A1 Feb. 27, 2014

Related U.S. Application Data

(63) Continuation of application No. 13/593,718, filed on Aug. 24, 2012.

(51) Int. Cl.
G06F 9/46 (2006.01)
G06F 15/00 (2006.01)
G09G 5/00 (2006.01)
G06F 17/30 (2006.01)

(52) U.S. Cl.
CPC . *G09G 5/00* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 2010/0281166 A1 | 11/2010 | Buyya et al. | |
| 2011/0208947 A1* | 8/2011 | Lin et al. | 712/28 |
| 2011/0276789 A1* | 11/2011 | Chambers et al. | 712/220 |
| 2011/0276962 A1* | 11/2011 | Chambers et al. | 718/1 |
| 2011/0296411 A1 | 12/2011 | Tang et al. | |
| 2011/0302226 A1 | 12/2011 | Abadi et al. | |
| 2012/0030553 A1 | 2/2012 | Delpha et al. | |
| 2012/0078951 A1* | 3/2012 | Hsu et al. | 707/769 |
| 2012/0311581 A1* | 12/2012 | Balmin et al. | 718/100 |
| 2013/0346625 A1 | 12/2013 | Lam et al. | |
| 2014/0055496 A1 | 2/2014 | Cunningham et al. | |

FOREIGN PATENT DOCUMENTS

WO WO2011153242 A1 12/2011

OTHER PUBLICATIONS

Ferguson, "Advances in Analytical Databases and Hardware Appliances for High Performance Analytics," http://www.insideanalysis.com/2011/11/advances-in-dbms/ , Nov. 29, 2011.
Kobielus, "Aster Data Deal Drives MapReduce Into Teradata's Strategy," InformationWeek Mar. 4, 2011.

(Continued)

*Primary Examiner* — Adam Lee
(74) *Attorney, Agent, or Firm* — Scully, Scott, Murphy & Presser, P.C.; Preston Young, Esq.

(57) ABSTRACT

Executing a map reduce sequence may comprise executing all jobs in the sequence by a collection of a plurality of processes with each process running one or more mappers, combiners, partitioners and reducers for each job, and transparently sharing heap state between the jobs to improve metrics associated with the job. Processes may communicate among themselves to coordinate completion of map, shuffle and reduce phases, and completion of said all jobs in the sequence.

22 Claims, 10 Drawing Sheets

(56) References Cited

OTHER PUBLICATIONS

Garg et al, "Real-Time Memory Efficient Data Redundancy Removal Algorithm," Proceedings 19th ACM international conference on Information and knowledge management,Oct. 2010.
Voltdb, Inc. "A high performance, scalable RDBMS for Big Data, high velocity OLTP and realtime analytics," 2009. http://www.crestingwave.com/sites/default/files/collateral/voltdb_whitepaper_technicaloverview.pdf.
Nick et al., "S/390 cluster technology: Parallel Sysplex," IBM Systems Journal, vol. 36, No. 2, 1997.
Vernica, et al. "Adaptive MapReduce using Situation-Aware Mappers", EDBT, Mar. 26-30, 2012, pp. 420-431.
Battre, et al. "Nephele/PACTs: A Programming Model and Execution Framework for Web-Scale Analytical Processing". SoCC'10 ACM, Jun. 10-11, 2010, pp. 119-130.
Bu et al. "The HaLoop approach to large-scale iterative data analysis", VLDB Journal, Mar. 14, 2012, pp. 169-190, University of California-Irvine Springer-Verlag.
Shinnar et al. "M3R: Increased Performance for InMemory Hadoop Jobs", Proceedings of the VLDB Endowment, vol. 5, No. 12, Aug. 27-31, 2012, pp. 1736-1747.
Ogawa et al. SSS: An Implementation of Key-value Store based MapReduce Framework. AIST. 2010, pp. 754-761.

* cited by examiner

TRANSPARENT EFFICIENCY FOR IN-MEMORY EXECUTION OF MAP REDUCE JOB SEQUENCES

CROSS-REFERENCE TO RELATED APPLICATIONS

This application is a continuation of U.S. patent application Ser. No. 13/593,718 filed on Aug. 24, 2012, the entire contents of which are incorporated herein by reference.

FIELD

The present application relates generally to computers, and computer applications, and more particularly to MapReduce job sequences in distributed processing.

BACKGROUND

Increasingly inter-connected, global computing systems are generating an enormous amount of irregular, unstructured data. Mining such data for actionable business intelligence can give an enterprise a significant competitive advantage. High-productivity programming models that enable programmers to write small pieces of sequential code to analyze massive amounts of data are particularly valuable in mining this data.

Over the last several years, MapReduce has emerged as an important programming model in this space. In this model, the programming problem is broken up into specifying mappers (map operation) and reducers (reduce operation). A mapper takes a small chunk of data (typically in the form of pairs of (key,value)), and produces zero or more additional key value pairs. Multiple mappers are executed in parallel on all the available data, resulting in a large collection of (key,value) pairs. These pairs are then sorted and shuffled. Briefly, moving map outputs to the reducers is referred to as shuffling. Another piece of programmer-supplied code (the reducer) is used to reduce the set of values associated with a given key. Multiple reducers operate in parallel, one for each generated key. There are many software applications that implement the MapReduce, for example, provide programming or software framework or application programming interfaces for allowing users to program the MapReduce functionality. An example is Apache™ Hadoop™. Hadoop™ MapReduce (HMR) is a software framework for writing distributed applications.

In HMR, input is usually taken from (and output is written to) a distributed, resilient file system (such as HDFS. a Hadoop file system). A partitioned input key/value (KV) sequence I is operated on by mappers to produce another KV sequence J, which is then sorted and grouped ("shuffled") into a sequence of pairs of key/list of values. The list of values for each key is then operated upon by a reducer which may contribute zero or more KV pairs to the output sequence. If the involved data sets are large, they are automatically partitioned across multiple nodes and the operations are applied in parallel.

This model of computation has many remarkable properties. First, it is simple. The HMR application programming interface (API) specifies a few entry points for the application programmer—mappers, reducers/combiners, partitioners, together with input and output formatters. Programmers merely need to fill out these entry points with (usually small) pieces of sequential code. Briefly, partitioning refers to sending specific key/value pairs to specific reducers. A combiner receives outputs of mappers as inputs. Outputs of a combiner are sent to a reducer. A partitioner performs such partitioning.

Second, it is widely applicable. A very large class of parallel algorithms (on structured, semi-structured or unstructured data) can be cast in this map/shuffle/reduce style.

Third, the framework is parallelizable. If the input data sequence is large, the framework can run mappers/shufflers/reducers in parallel across multiple nodes thus harnessing the computing power of the cluster to deliver scalable throughput.

Fourth, the framework is scalable: it can be implemented on share-nothing clusters of several thousand commodity nodes, and can deal with data sets whose size is bounded by the available disk space on the cluster. This is because mappers/shufflers/reducers operate in streaming mode, thus supporting "out of core" computations. Data from the disk is streamed into memory (in implementation-specified block sizes), operated on, and then written out to disk.

Fifth, the framework is resilient. A job controller tracks the state of execution of the job across multiple nodes. If a node fails, the job controller has enough information to restart the computation allocated to this node on another healthy node and knit this new node into the overall computation. There is no need to restart the entire job. Within limits, of course, if there are a large number of failures, the job controller may give up. The job controller itself is a single point of failure, but techniques can be applied to make it resilient. Key to resiliency is that the programmer supplied pieces of code are assumed to be functional in nature, i.e., when applied to the same data the code produces the same result.

Because of these properties, the HMR engine is now widely used, both as a framework against which people directly write code (e.g., for Extract/Transform/Load tasks) and as a compiler target for higher-level languages.

The design point for the HMR engine is offline (batch) long-lived, resilient computations on large commodity clusters. To support this design point, HMR makes many decisions that have a substantial effect on performance. The HMR API supports only single-job execution, with input/output being performed against an underlying file system (HDFS). This means that if a higher level task is to be implemented with multiple jobs, each job in this sequence must write out its state to disk and the next job must read it in from disk. This incurs I/O cost as well as (de-) serialization cost. Mappers and reducers for each job are started in new JVMs (JVMs typically have high startup cost). An out-of-core shuffle implementation is used: the output of mappers is written to local disk; a file transfer protocol is used to move these files to their target nodes and an out-of-core sorting algorithm is used to group the records by key for the reduce phase.

As discussed above, the MapReduce programming model can be made resilient to failure. A monitoring process keeps track of all the mapper processes. If a mapper process fails, the monitoring process starts another process with the same input data that it had given the failed process. The JobTracker in Hadoop™ MapReduce framework is an example of such monitoring process. The JobTracker is responsible for distributing and scheduling the tasks and monitoring them. If a mapper process fails, the JobTracker starts another process (on a different node in the network) and gives it the same input chunk of data that it had given the failed process. Under the mild assumption that the same mapper code will produce the same result on the same input when run more than once, this new process will produce output identical to what the old process would have produced.

Map Reduce jobs are typically executed on one or more nodes running in a cluster. The Hadoop Map Reduce engine, for instance, implements a Map Reduce job as follows.

The client prepares a job configuration object specifying the classes to be used during execution, the number of reducers used to run the job, the location of the HMR jobtracker, etc. This configuration object is threaded throughout the program (and passed to user classes), and can hence be used to communicate information of use to the program. The job configuration object is submitted in a call to JobClient.submitJob. This library function obtains a jobid from the Hadoop jobtracker, and writes out the necessary job information to the jobtracker's filesystem (in a jobid-relative path), including the job configuration object and the user code to be run. The user's InputFormat is instantiated, and asked to produce InputSplits, metadata that describes where each "chunk" of input resides. These are also written out to the job's directory. Finally, the jobtracker is notified that a new job with the given jobid has been submitted.

FIG. 3 presents a high level view of the data flow for a single Hadoop job (each mapper and reducer box represents multiple processes). Dotted lines represent cheap in-memory communication. Solid black lines represent expensive out of memory (disk or network) operations. The jobtracker schedules the job to run, allocating map and reduce tasks on available task trackers. The map tasks (allocated close to their corresponding InputSplits) must next read input data. If the data is in HDFS (common case), reading requires network communication with the namenode (storing the file metadata). Reading the actual data requires file system I/O (which may not require disk I/O if the data is in kernel file system buffers), and may require network I/O (if the mapper is not on the same machine as the one hosting the data). The map tasks deserialize the input data to generate a stream of key/value pairs that is passed into the mapper. The mapper outputs key/value pairs, which are immediately serialized and placed in a buffer. While in the buffer, Hadoop™ may run the user's combiner to combine values associated with equivalent keys. When the buffer fills up, they are sorted and pushed out to local disk.

Once map output has been pushed out to disk, reducer tasks start fetching their input data. This requires disk and network I/O. Each reducer performs an out-of-core sort of its input data. After all of the mappers have completed and the data is sorted, each reducer starts processing its input. Each reducer outputs a (possibly empty) sequence of key/value pairs that is sent to the OutputFormat (and its attendant RecordWriter) for output. Typically, this involves serializing the data and writing it out to disk. The namenode is contacted to update the required file system metadata. Since Hadoop assumes that data nodes and compute nodes are co-located, writing out the actual data does not involve network communication.

The shuffle phase is the part of the MapReduce programming model that handles communication. To optimize this phase, the user may specify a combiner, which acts like a reducer but runs only on some fraction of the data emitted from a single mapper to a given reducer. The intention is to cut down the amount of data that must be transmitted over the network. The combiner may run additional times, to fold fresh input from the mapper into previously combined output. To implement this, the mapper outputs key/value pairs, which are immediately serialized and placed in an in-memory buffer. When this buffer reaches a certain size, Hadoop™ may run the user's combiner on the data in the buffer, to combine values associated with equivalent keys. To do this, it must deserialize the buffer into the original in-memory representations, run the combiner, then reserialize the combiner output back into the buffer to replace the original data. When the buffer fills with data that cannot be further combined, the key/value pairs are pushed out to local disk. These disk files are served by a daemon at each mapper. Each reducer contacts every mapper to gather together the pieces of its input that are distributed across the various local filesystems, aggregates the pieces, and presents the sorted result as input to the user's reduce code.

There are two performance implications of this design. Firstly, by supporting out-of-core execution, the combiner must operate on serialized byte buffers. Serializing and then deserializing this data wastes central processing unit (CPU) cycles. Secondly, Hadoop™ exposes multi-core execution by running many JVM instances. It is not possible to combine output across JVM instances. Although Hadoop allows re-use of JVMs from one task to the next, this is to avoid JVM init/teardown costs, there is no re-use of heap data between tasks.

BRIEF SUMMARY

A method for executing a map reduce sequence, in one aspect, may comprise executing, by one or more processors, all jobs in the sequence by a collection of a plurality of processes with each process running zero or more mappers, combiners, partitioners and reducers for each job, and transparently sharing heap state between the jobs to improve metrics associated with the job. The method may also comprise communicating among the processes to coordinate completion of map, shuffle and reduce phases, and completion of said all jobs in the sequence.

A method for executing a map reduce sequence, in another aspect, may comprise executing, by one or more processors, all jobs in the sequence by a collection of a plurality of processes with each process running zero or more mappers, combiners, partitioners and reducers for each job. The method may also comprise employing a cache memory comprising an association of input descriptors to an in-memory representation of a key value sequence obtained by running a corresponding input format descriptor on the input descriptor, and an association of output descriptors with the in-memory representation of the key value sequence consumed by the corresponding output format descriptor to produce the data associated with the output descriptor, to enable transparently sharing heap state between the jobs. The method may further comprise communicating among the processes to coordinate completion of map, shuffle and reduce phases, and completion of said all jobs in the sequence.

A system for executing a map reduce sequence, in one aspect, may comprise a map reduce module or like engine operable to execute on a processor, and further operable to execute all jobs in the sequence by a collection of a plurality of processes with each process running zero or more mappers, combiners, partitioners and reducers for each job. An in-memory cache enables transparently sharing of heap state between the jobs. The map reduce module may be further operable to coordinate completion of map, shuffle and reduce phases, and completion of all jobs in the sequence.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
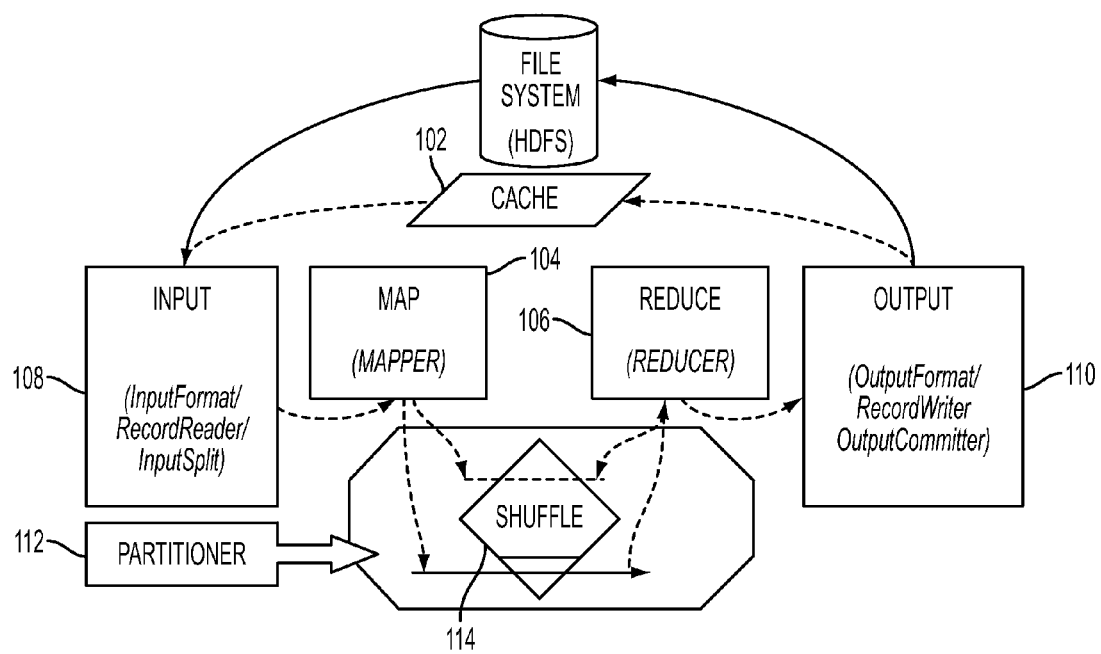
FIG. 1 illustrates an execution and data flow of M3R in one embodiment of the present disclosure.

The present disclosure is related to increasing the performance of MapReduce job sequences in distributed processing. A method of the present disclosure in one embodiment applies to Hadoop MapReduce or the like job sequence. In one embodiment, the method may run all jobs in the Hadoop MapReduce job sequence and potentially run multiple mappers and reducers in the same job. The method may store key value sequences in a family of long-lived Java™ virtual machines (JVMs) and share heap-state between jobs. It should be understood that while the present disclosure refers to Hadoop's MapReduce model, the methodology of the present disclosure may apply to another like model.

A methodology in one embodiment of the present disclosure optimizes the shuffling phase of the MapReduce programming model for in-memory workloads. Such workloads fit in aggregate global cluster memory. In one embodiment of the present disclosure, a combiner may be run for a given mapper after accumulating all the output of that mapper, and before transmitting anything across the network. This allows to optimally cut down the required network traffic without serialization overhead. This technique achieves the same performance transparently as if objects in an application-level buffer in Hadoop were accumulated. To avoid unnecessary serialization and inter-process communication when shuffling data between map/reduce tasks that run on the same host, the methodology of the present disclosure in one embodiment runs all such tasks in the same JVM process. This allows the combiner to execute on pairs emitted from more than one mapper, to further cut down on the amount of data needing to be emitted from a single JVM.

Both these optimizations may be provided by storing output from the local mappers in a number of sorted tree map data structures. This data structure provides operations to put/get values at a particular key, as well as an ordered iteration over key/value pairs. The tree map stores, for each key, the list of values emitted in key/value pairs with that key. Buffering this data in memory requires that mappers do no mutate key/value pairs after they have been supplied as output. The method in one embodiment of the present disclosure transparently wraps non-conforming mappers (identified by the absence of an interface annotation) to clone their output, if required.

In one embodiment of the present disclosure, each mapper has a tree map for each destination reducer, which stores the data output by that mapper for that reducer (determined by executing the partitioner on each key). When all local mappers have terminated, these trees are merged together (preserving their ordering) into one tree for each destination reducer. The combiner is executed during this process, after all values for a given key have been merged from the individual mapper's output. The result is written into the buffer for communication.

In the present disclosure, a Map Reduce Sequence (MRS) is a sequence of Map Reduce Jobs (MR Jobs). An MR Job is specified by at least the following configuration information: (a) Zero or more input descriptors (ID); (b) Zero or more input format descriptors (IFD), specifying code that takes as input data associated with said descriptors (and may take other inputs) and produces one or more key value sequences; (c) Mapper code (M) that takes as input said key value sequences (and may take other inputs) and produces other key value sequences; (d) Combiner code (C) that takes as input a key and a sequence of values (and may take other inputs) and produces zero or more key value pairs; (e) Partitioner code (P) which takes as input a key, a value, the number of partitions, (and may take other inputs) and produces a number, the partition number; (e) Reducer code (R) that takes as input a key and a sequence of values for that key (produced by c), and generates zero or more key value pairs; (f) Zero or more Output Descriptors (OD); (g) Zero or more output format descriptor (OFD), specifying code that takes as input key value sequences produced from (e) and produces output data (e.g. sequence of bytes) capable of being stored in stable storage.

Figure 2:
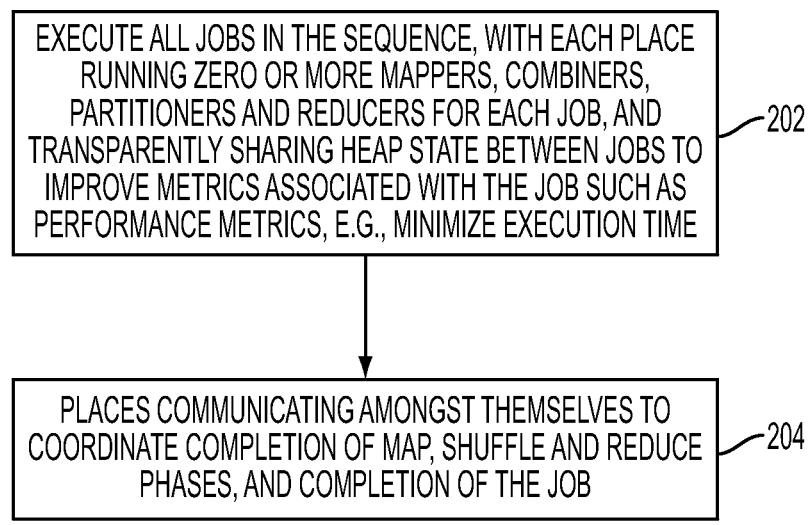
FIG. 2 illustrates a method of executing a map reduce sequence.
Figure 3:
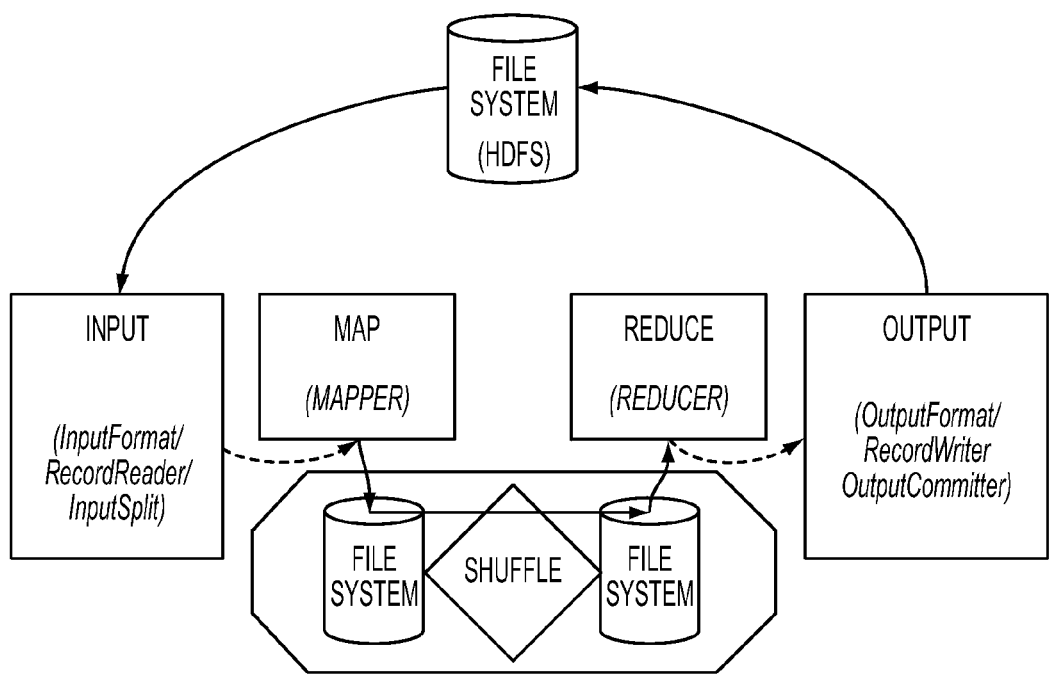
FIG. 3 presents a high level view of the data flow for a single Hadoop job.

FIG. 2 illustrates a method of executing a map reduce sequence. A method for executing a map reduce sequence (S), in one embodiment, may comprise at 202, a collection of multiple (e.g., N>1) processes (called "places"), executing all jobs in the sequence, with each place running one or more mappers, combiners, partitioners and reducers for each job, and transparently sharing heap state between jobs to improve metrics associated with the job such as performance metrics, e.g., minimize execution time. The method may further comprise at 204, the places communicating amongst themselves to coordinate completion of map, shuffle and reduce phases, and completion of the job.

A map ("cache") may comprise an association of some or all identifiers (IDs) to an in-memory representation (stored in some or all places) of the key value sequence obtained by running the corresponding IFD on the ID; and an association of some or all ODs with the in-memory representation (stored in some or all places) of the key value sequence consumed by the corresponding OFD to produce the data associated with the OD. For example, the ID could be "hamlet.txt", and the IFD could be TextInputFormat. The resulting key value sequence could be a sequence of words and their position in the input. The OFD could be TextOutputFormat associated with the OD "wordcount" and represent the in memory key-value sequence, in this example, a word/count sequence.

A logic for fulfilling reads from ID (using IFD) from the cached value associated with the ID, and for fulfilling reads from OD using an IFD (which is established to be an inverse of the OFD used to write the OD out) may use the cached value associated with the OD. For example, reads from the ID are fulfilled by cached values that were created by the previous OFD and IFD.

In one embodiment of the present disclosure, a shuffle of key value pairs occurs between the mappers executing in memory. In one embodiment, performing de-duplication with the shuffle ensures that fewer, e.g., only one copy of a key or value is sent to a place q from another place p, regardless of the number of copies of the key or value intended to be sent from p to q.

A guarantee ("partition stability") guarantees that across all jobs in the sequence the same partition number is mapped to the same place.

A determination may be made of the mapping from partition number to place being determined by the first job in the sequence that loads input from an IFD. The mapping made for the first job is the same mapping for subsequent jobs in one embodiment. Mapping from a partition number to a process may be determined by or before the first job in the sequence that requires that mapping.

A copy may be made of the key value pairs emitted by the mapper before they are added to the cache unless it can be established the mapper does not reuse the key value pair it has emitted, e.g., either by using a flag submitted in the job configuration, or analyzing the code of the mapper.

In one embodiment, a copy may be made of the key value pairs as a part of a shuffle phase, e.g., in addition to the cache. The key value pairs may be transmitted in the shuffle, unless it can be established the mapper does not reuse the key value pair it has emitted, i.e., if the mapper may reuse the key value pairs it has emitted.

A copy may be made of the key value pairs emitted by the reducer before they are added to the cache unless it can be established (either by using a flag submitted to the job, or analyzing the code of the reducer) that the reducer does not reuse the key value pair it has emitted.

Similarly, a copy may be made of the key value pairs emitted by the combiner before they are added to the cache unless it can be established (either by using a flag submitted to the job, or analyzing the code of the reducer) that the combiner does not reuse the key value pair it has emitted.

In one embodiment of the present disclosure, an engine or a processing module may be presented to execute MapReduce programs. The engine in the present disclosure is referred to as a main memory map reduce (M3R) engine. FIG. 1 illustrates an execution and data flow of M3R in one embodiment of the present disclosure. Dotted lines in the figure represent cheap in-memory communication. Solid lines represent expensive out of memory (e.g., disk or network) operations. A client may submit multiple jobs to the M3R engine, which distributes the work to compute nodes across a cluster. An M3R instance is associated with a fixed set of JVMs (e.g., spawned by the X10 runtime, one per place) that are used to run both mapper and reducer jobs, and is used to run multiple jobs. Reusing VMs reduces startup cost and permits data to be kept in memory between jobs. In the common case of job pipelines (the output of one job is immediately used by the next job) M3R affords significant benefits in avoiding network, file I/O and (de-)serialization costs.

Input/Output Cache

M3R introduces an in-memory key/value cache 102 to permit in-memory communication between multiple jobs in a job sequence. M3R may use the client provided RecordReader (e.g., 108) to read in data and deserialize it into a key/value sequence. Before passing it to the mapper 104, M3R caches the key/value pairs in memory (associated with the input file name) 102. In a subsequent job, when the same input is requested, M3R will bypass the user provided RecordReader and obtain the required key/value sequence directly from the cache 102. Since the data is stored in memory, there are no attendant (de)serialization costs or disk/network I/O activity.

Similarly, when reducers 106 emit a key/value pair, M3R caches it (associated with the output file name) 102 before using the RecordWriter (e.g., at 110) to serialize it and write it to disk. Subsequent reads from this file name can be fulfilled from the cache (102). If the output data is determined to be temporary (only needed for subsequent jobs in the sequence), then the data does not even need to be pushed to disk.

The cache 102 in M3R is mostly transparent (not visible) to the user, as it is intended to work with unmodified Hadoop™ or the like jobs. There may be some instances where cache awareness is beneficial or needed. In one embodiment of the present disclosure, a set of extensions or functions may be provided for explicit interaction with the cache 102.

Reducing Shuffle Overhead

Colocation

In one embodiment, when M3R runs a job, it distributes the required information to each place and starts multiple mappers and reducers in each place (running in parallel). As a result, some of the data a mapper is sending is destined for a reducer running in the same JVM. The M3R engine is careful to make this case efficient, and may guarantee that no network, or disk I/O is involved.

For locally shuffled data, the engine (e.g., at 114) tries to avoid the time and space overhead of (de)serialization. Hadoop™ assumes that map (and reduce) output is immediately serialized and encourages clients to mutate them after they have been passed to the engine. To accommodate Hadoop's behavior, M3R makes a copy of the key/value pair. An extension is introduced in the present disclosure for allowing job writers to inform the engine that a given map or reduce class is well-behaved and does not mutate values that it has output to the engine. For these classes, the key/value pair output by the mapper can be passed directly into the reducer, avoiding serialization or de-serialization.

Partition Stability

The above co-location strategy yields a performance boost to most jobs. Some fraction of data may be shuffled locally, reducing intra-job communication. In addition, M3R further allows carefully written algorithms to deliberately exploit locality, dramatically decreasing communication and serialization or de-serialization costs.

A Partitioner 112 maps keys to partitions and allows a programmer to control how keys are distributed amongst the reducers. This may be done for load balancing purposes and for global sorting (across reducers). The default implementation uses a hash function to map keys to partitions. Unlike Hadoop™ that does not allow the programmer any control over where the reducer associated with a partition is run and that transparently restarts failed reducers on different hosts, M3R in one embodiment provides programs with the following partition stability guarantee: for a given number of reducers, the mapping from partitions to places is deterministic. This allows job sequences that use a consistent partitioner to route data locally. The output of a given reducer is cached at the place where it is written. If it is read by a subsequent job, the mapper associated with that data will be assigned to the same place. If the mapper then outputs keys that map to the same partition, it is guaranteed that the key will be locally shuffled.

For illustration consider the matrix vector multiplication example. The first job has two inputs: the matrix G and the vector V. The matrix G is far larger, as its size is quadratic in the size of V. As a result, it is critical that G not be moved. Parts of G (e.g., a set of contiguous rows) should be read in by each place and then left there for the entire job sequence. This can be accomplished by using an appropriate partitioner (e.g., one that assigns to place i the i-th contiguous chunk of rows). This ensures that for the first job all the partial products (the product of a fragment of a row with a fragment of a column, for a given row) are co-located. The same partitioner is used for the second job and ensures that they are sent to a co-located reducer for summation. As a result, the shuffle phase of the second job in each iteration can be done without any communication.

DeDuplication

Consider the matrix vector multiply example again. The first job must broadcast V to all the reducers. However, each place has a number of reducers, say k. It would be beneficial for M3R to not send k copies of V to each place. Note the HMR engine does not co-locate reducers, so this optimization does not apply to HMR. M3R in one embodiment takes advantage of a feature of the underlying X10 serialization protocol to transparently de-duplicate the data sent to a place. If the mappers at place P output the identical key or value multiple times for a reducer located at place Q, only one copy of the key or value is serialized. On deserialization Q will have multiple aliases of that copy.

In one embodiment of the present disclosure, a combiner is run directly on the in-memory data output by the user's map code. In addition, output across JVM instances need not be combined to cut down network traffic from the host in question. A method of the present disclosure may use main-memory MapReduce. The methodology of the present disclosure in one embodiment may be applicable to non-annotation MapReduce applications such as WordCount and Matrix Multiply. The methodology of the present disclosure in one embodiment may be applicable to those applications that use the collective resources of a cluster of computers, e.g., commodity hardware, to execute a program. In one aspect, the methodology of the present discourse speeds up the processing of data in the Hadoop Filesystem by executing it on the same machines that store the data, without the need to push the data into an external database system for processing. The methodology of the present disclosure may include how a MapReduce program executes on a given set of hardware. The methodology of the present disclosure in one embodiment supports the execution of general purpose MapReduce algorithms in memory.

M3R in one embodiment provides an implementation of a Map Reduce API, e.g., Hadoop Map Reduce (HMR) API, targeted at online analytics on high mean-time-to-failure clusters. It supports those workloads which can fit into cluster memory. In return, it can run HMR or the like jobs unchanged—including jobs produced by compilers for higher-level languages such as Pig, Jaql, and SystemML and interactive front-ends like IBM™ BigSheets—while providing performance improvements over the Hadoop engine on several workloads (e.g., 45× on some input sizes for sparse matrix vector multiply). M3R also supports extensions to the HMR or the like API which can enable Map Reduce jobs to run faster on the M3R engine, while not affecting their performance under the Hadoop or the like engine.

The demands of interactive analytics (e.g., interactive machine learning) lead to a different design point. Here in one aspect, the data to be operated upon has already been cleaned and digested and reduced to arrays of numbers that are (on the higher end) terabytes big (rather than petabytes). This data can be held in the memory for scores of nodes (one does not need thousands of nodes). Indeed, the increasing amount of main memory currently available on nodes makes in-memory execution even more attractive. Furthermore, algorithms in this space tend to be iterative, operating on large data-structures in phases. The methodology of the present disclosure in one embodiment may achieve performance closer to that delivered by in-core (multi-node) high performance computing (HPC) algorithms.

In the present disclosure, a distinction is made between the Hadoop Map Reduce APIs (referred to in the present disclosure as HMR APIs) and the Hadoop Map Reduce implementation (referred to in the present disclosure as the HMR Engine). In one embodiment, M3R implements the HMR APIs—thus it can run existing Hadoop jobs, including jobs produced by tool-chains above Hadoop, such as Pig, Jaql and SystemML. The HMR APIs supported by M3R include the mapred and mapreduce APIs, counters, user-specified sorting and grouping comparators, user-defined input/output formats and the Hadoop distributed cache. M3R may be agnostic to the file system, so it can run HMR jobs that use the local file system or HDFS.

In one embodiment, M3R is a new engine comprising the following functions:

a. In-memory execution: In one embodiment, M3R stores key value sequences in a family of long-lived JVMs, sharing heap-state between jobs. This makes M3R scalability to the size of memory on the cluster (not the size of disks on the cluster).

b. No resilience: In one embodiment, the engine may fail if any node goes down—it does not recover from node failure. This means that M3R is useful for networks with high mean time to failure. These can be commodity clusters with scores of nodes or high performance systems with much larger node counts.

c. Performance: The engine should deliver performance close to main memory execution.

In one embodiment, M3R may be implemented in X10, a modern type-safe, object-oriented, multi-threaded, multi-node, garbage-collected programming language designed for high-productivity, high-performance computing. X10 is built on the two fundamental notions of places and asynchrony. An X10 program typically runs as multiple operating system processes (each process is called a place and supplies memory and worker-threads), and uses asynchrony within a place and for communication across places. Over a standard modern, sequential, class-based, object-oriented substrate (with support for functions and structs, and a sophisticated constraint-based type system), X10 has four core, orthogonal constructs for concurrency and distribution: async S (to execute S asynchronously), finish S (to execute S and wait for all its asyncs to terminate), when (c) S (to execute S in one step from a state in which c is true), and at (p) S (to switch to place p to execute S). The power of X10 arises from the fact that these constructs can be nested arbitrarily (with very few restrictions), and thus lexical scoping can be used to refer to local variables across places. The X10 compiler produces C++ for execution on a native back-end and also Java™ for execution on multiple JVMs. The X10 runtime (written primarily in X10) ensures that the execution of at transparently serializes values, transmits them across places and reconstructs the lexical scope at the target place. The X10 runtime provides fast multi-place coordination mechanisms, such as barriers and teams. X10 runs on sockets, on PAMI, and on MPI (and hence on any transport on which MPI runs, including Infiniband).

The M3R engine, implemented in X10, enjoys the following advantages over Hadoop:

1. Each instance of M3R runs on a fixed number (possibly one) of multi-threaded JVMs. An M3R instance runs all jobs in the HMR job sequence submitted to it, potentially running multiple mappers and reducers in the same JVM (for the same job), and sharing heap-state between jobs.
2. The job tracker and the heartbeat mechanism is completely eliminated. Instead fast X10 constructs (barriers, teams) are used to coordinate mappers and reducers and signal job completion.
3. On input from the file system, M3R associates the input splits with the global (multi-place) key value sequence obtained from this input. Subsequent invocations of the input splits (e.g. by subsequent jobs in the sequence) are fulfilled by reading the key value sequence from the heap, eliminating the need to read from the file system again, and de-serialize. Similarly, output to an output formatter is associated with the global key value sequence so that subsequent input requests can be fulfilled from the key value sequence.
4. The shuffle of key value pairs is done in memory, using X10 inter-process communication. It enjoys the benefit of de-duplication performed by the X10 serialization mechanism.
5. M3R implements a guarantee (partition stability) that the same partition number is mapped to the same place, across all jobs in the sequence. This property enables programmers to write HMR jobs that can simply re-use memory structures across jobs and avoid a significant amount of communication.

The payoff from these advantages is that small HMR jobs can run instantly on M3R, avoiding start-up cost of the HMR engine and can run faster on M3R. Programs in languages higher in the Hadoop tool stack (e.g., Pig, Jaql and System ML jobs) may run unchanged.

To implement M3R, several technical problems have been solved:

Control over cloning. HMR encourages reusing keys and values, necessitating expensive cloning by the M3R engine. A method in one embodiment of the present disclosure provides a way by which a programmer can specify that keys/values need not be cloned.

Control over caching. A method in one embodiment of the present disclosure allows the programmer to specify which files should be cached and when the cache should be flushed.

A method in one embodiment of the present disclosure may also allow for exposing partition stability and allowing for locality-aware programming within the confines of the HMR API.

The present disclosure identifies a distinction between HMR APIs and the HMR engine; illustrates that HMR APIs can be implemented in a main-memory implementation with substantial benefits (e.g., reduced start-up time, significant performance gain); identifies the sources of performance gain in the M3R engine; identifies extensions to the HMR APIs which can be used by Map Reduce jobs to achieve better performance on M3R, without affecting performance on Hadoop; demonstrating that Pig, Jaql and SystemML programs can run unchanged on M3R with minor modifications to the compilers.

In one embodiment of the present disclosure the M3R engine caches all key/value pairs in memory at each machine, and it attempts to execute MapReduce jobs where their data is located. Because M3R caches everything in this embodiment, there is no need for an API to specify what is to be reused. Thus M3R is able to achieve the iterative job performance improvements of HaLoop, without the burden of changing existing Hadoop programs to use new APIs.

Figure 4:
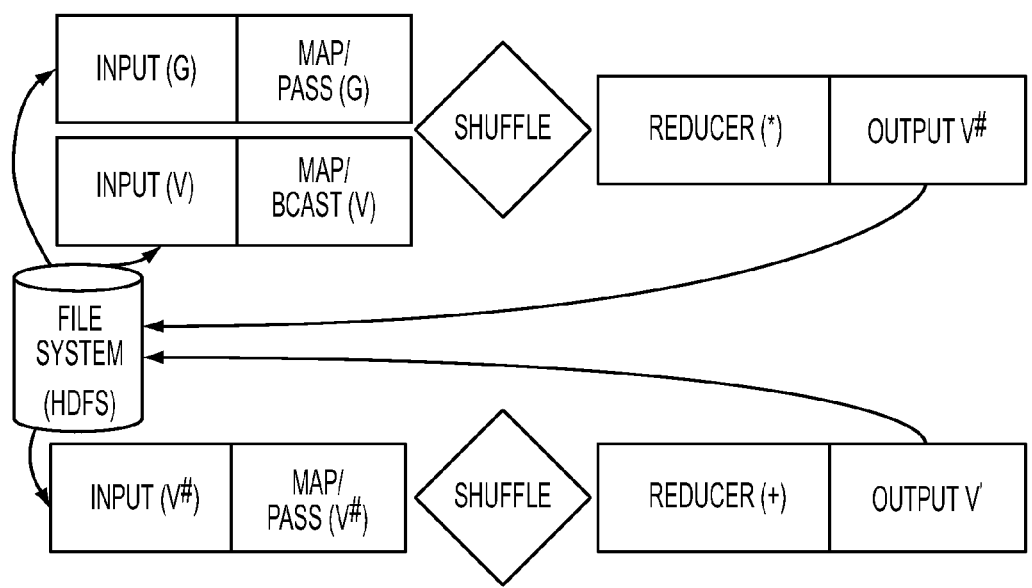
FIG. 4 shows an example application for iteratively multiplying together a sparse matrix and dense vector.

FIG. 4 shows an example application for iteratively multiplying together a sparse matrix and dense vector. It shows data flow for an iteration of matrix-vector multiplication. This is the core computation inside PageRank. A single matrix multiply is implemented with two MR jobs: the first to calculate the appropriate scalar products and the second to sum them. Since the HMR API does not represent work-flows the client must submit two MR jobs (for each iteration), using the output of the first as an input to the second. Note that the input matrix G remains unchanged through both jobs. The matrix G is row-block partitioned, and the vector V is broadcast as needed.

In one embodiment, M3R extends the HMR APIs in a backward compatible way, for example, to eliminate needless (de)serialization, to interact with the cache, and to enable locality aware algorithms.

ImmutableOutput

The Hadoop API assumes that mapper and reducer output is immediately serialized. As a result, it allows the mapper and reducer to mutate keys and values after they have been output, to avoid allocation costs. For example, Table 1 presents the mapper from a typical word count example. Such reuse of keys or values is not compatible with caching. To maintain integrity, M3R by default clones keys and values produced by mappers and reducers. If the map or reduce class promises to not mutate keys and values that it has emitted—it does this in one embodiment by implementing Immutable-Output—M3R does not clone. Note that Hadoop will simply ignore this interface, allowing the same code to be run on M3R and Hadoop. Table 2 code presents the same word count mapper example modified to satisfy the ImmutableOutput constraints.

With the old style "mapred" interface, the user can also provide a custom MapRunnable implementation to manually connect the input to the mapper. Any such custom MapRunnable implementation are also marked as producing immutable output for M3R to avoid cloning.

TABLE 1

```
class Map ... {
    d. IntWritable one = new IntWritable(1);
    e. Text word = new Text( );
    f. void map(LongWritable key, Text value, OutputCollector
       output, Reporter r) {
        1.   String line = value.toString( );
        2.   StringTokenizer tokenizer = new StringTokenizer(line);
        3.   while (tokenizer.hasMoreTokens( )) {
             1. word.set(tokenizer.nextToken( ));
             2. output.collect(word, one);
        4.   }
    g. }
}
```

TABLE 2

```
class Map ... implements ImmutableOutput {
    h. IntWritable one = new IntWritable(1);
    i. void map(LongWritable key, Text value, OutputCollector
       output, Reporter r) {
        1.   String line = value.toString( );
        2.   StringTokenizer tokenizer = new StringTokenizer(line);
        3.   while (tokenizer.hasMoreTokens( )) {
             1. Text word = new Text(tokenizer.nextToken( ));
             2. output.collect(word, one);
        4.   }
    j. }
}
```

The default MapRunnable implementation used by Hadoop reuses the same key/value for each input and so does not conform to the required contract for ImmutableOutput. This means that if the mapper just passes along the input (e.g., the identity mapper), the output will be mutated by the default implementation. M3R specially detects the default implementation and automatically replaces it with a customized version that allocates a new key/value for each input and is (appropriately) marked as ImmutableOutput.

Key/Value Cache

M3R introduces a key/value cache for job inputs and outputs. Simple Hadoop programs can transparently benefit from the cache. However, more sophisticated programs can benefit from some cache interactions. These range from interfaces that allow code to teach M3R how to better interact with their custom input/output code to code that explicitly modifies or queries the cache.

Naming Data

The Hadoop InputSplit, InputFormat, and OutputFormat classes do not declare what name is associated with a given piece of data. Focusing on InputSplits, this makes it difficult to identify what data input is referring to. Without a name, there is no way to cache the data for subsequent use.

M3R understands how standard Hadoop input and output formats work, in particular the File (Input/Output) Format classes and the FileSplit class. Given a FileSplit, it can obtain the file name and offset information and use that to enter/retrieve the data in the cache.

For user-defined InputSplits, M3R provides a NamedSplit interface, allowing the split to provide the necessary information. The interface defines a single method, getName, which returns the name to use for the data associated with the split. Alternatively, if the split is a wrapper around another split then it can implement the DelegatingSplit interface and tell M3R how to get the underlying information.

If a split does not implement one of these interfaces and is not a standard type known to M3R then M3R is forced to bypass the cache for the data associated with the split. Note that (as with the ImmutableOutput interface) Hadoop simply ignores these interfaces, allowing the same code to run on M3R and Hadoop.

Multiple Inputs/Outputs

The Hadoop model only allows a single input format. Similarly, each reducer writes to a single output. For many applications, this is too restrictive. For example, the iterated matrix vector multiplication job sequence discussed above needs two inputs: the matrix and the vector. Furthermore, these inputs are routed to two different mappers. To address this type of situation, the Hadoop libraries come with the MultipleInputs and MultipleOutputs classes to multiplex input and output.

The MultipleInputs class uses TaggedInputSplit to tag input splits so they can be routed to the appropriate base input format and mapper. The DelegatingInputFormat class handles instantiating the underlying record readers. As a result, it needs to be cache aware. In particular, it needs to wrap the input formats it creates with the provided CachingInputFormat wrapper, which adds cache awareness to a base input format.

Similarly, the MultipleOutputs class creates additional named record writers, allowing the reducer to output to multiple explicitly named files. As with MultipleInputs, this code needs to be modified to enable caching.

The necessary changes to the standard libraries are transparently done by M3R. Client code implementing their own variant of these classes may make similar modifications.

Cache Management

Programs can explicitly manage the cache in different ways. They can mark outputs as "temporary", such that they need not be output to disk at all. This is suitable for outputs that will be consumed by subsequent jobs and are not needed by non-map/reduce code. In one embodiment, this may be done based on a naming convention: if the last part of the output path starts with a given string (which, for example, may default to "temp") then it is treated as temporary and not written out. This string can be customized by setting a property in the job's configuration. Adding settings to the job configuration is a practice in Hadoop for communicating additional information to jobs. In a similar way, a list of files that should be considered temporary could be passed enumerated in a job configuration setting.

Programs can also rename and delete data from the cache. M3R alters Hadoop's FileSystem class so that it transparently sends calls to operations such as rename, delete, and getFileStatus to both the cache and the underlying file system. However, there are times when the program wants to explicitly delete (or rename) data just from the cache, without affecting the underlying file system. To support this, the FileSystem objects created by M3R implement an additional CacheFS interface. This interface provides a getRawCache method that returns a new FileSystem object. Operations on this synthetic file system object are only sent to the cache of the original FileSystem. So calling delete on the synthetic file system will delete the file from the cache without affecting the underlying file system.

Cache Queries

Programs can also explicitly query the cache and obtain the key/value sequence associated with a path. A program can use getRawCache in conjunction with getFileStatus to check if data is in the cache and obtain its associated metadata. The CacheFS interface provides a getCacheRecordReader method that allows the program to obtain an iterator over the key/value sequence associated with a given path.

Partition Stability

M3R allows algorithms to exploit locality to reduce shuffle costs. The interface to this ability is primarily implicit, provided by an enhanced performance model.

M3R provides a PlacedSplit interface that allows an input split to inform M3R what partition the data should be associated with. Splits that implement this interface are sent to a mapper running at the place associated with that partition. This is beneficial in ensuring that the data goes to the right place at the very beginning. Using partition stability, the programmer can ensure that it stays there for the duration of the job sequence.

The iterated matrix vector multiplication example takes advantage of locality. This allows M3R to run the example far more efficiently than Hadoop.

Implementation

The X10 Programming Language and Core M3R Engine

X10 is a modern object oriented (OO) language for programming multi-core (providing fine-grained concurrency), heterogeneous, and distribution (scaling to thousands of nodes). It can be compiled to C++ or Java™, in which case Java™ classes (such as those in the Hadoop codebase) are exposed alongside X10 classes. This allows to use X10's sophisticated concurrency and distribution features while integrating cleanly with existing Java™ code.

The core M3R engine implements a minimal map/reduce API, focussing on concurrency and communication, and not handling, e.g., I/O. It may be written in pure X10, and utilize X10's fine-grained concurrency constructs to multi-thread the mappers/reducers, and parallelize shuffling. The actual communication may be handled using X10's at (p) S construct, which executes S at place p, automatically serializing and transmitting variables (and heap graphs referenced therefrom) captured in the enclosing scope. This serialization protocol handles cycles in the heap, recognizes when a given object has been serialized before.

This mechanism provides for free de-duplication. X10's Team API provides a barrier construct that the engine uses for synchronization. In one embodiment, no reducer is allowed to run until globally all shuffle messages have been sent. The methodology of the present disclosure in one embodiment may leverage a highly-performing and well-tested execution engine, and focus on the problem of map/reduce, for example, by utilizing X10 at the core of M3R.

Key/Value Store

TABLE 5

Key/value store API

Writer createWriter(File path, BlockInfo info)
Reader createReader(File path, BlockInfo info)
void delete(File path)
void rename(File src, File dest)
PathInfo getInfo(File path)
void mkdirs(File path)

M3R caches inputs and outputs as discussed above. Underneath this in one embodiment of the present disclosure is a distributed in-memory key/value store that implements a file system like API. The key/value store distributes the (hierarchal) metadata across the different places used by M3R. Table 5 presents the basic API exposed by the key value store. All operations are atomic (serializable) with respect to each other in one embodiment of the present disclosure, making it simple for callers to reason about their behavior. Paths are represented by Java™ File's, which represent abstract file system paths.

Like HDFS, paths can map to multiple blocks, each of which can be stored at a different place. Blocks are identified by their metadata. The key value store is generic in the type of metadata and may implement a reasonable equals method. In one embodiment, the key/value store is fully distributed: both the metadata and data are distributed across the places. Metadata is distributed using a static partitioning scheme: a path is hashed to determine where the metadata associated with that path is located. Data blocks can live anywhere: there location is specified by their metadata. The createWriter call creates a block at the place where it is invoked. Each place has a handle to its own concurrent hash tables (one for the metadata and one for the data). These map full paths to their associated metadata/data. When an operation needs to modify or access an entry associated with a path, it first atomically swaps out the entry with a special lock entry (or inserts it if there was nothing there beforehand). If the entry is already a lock entry, it (carefully) swaps in a heavier weight monitor entry that it then blocks on. When the task that previously locked the entry releases the lock it will detect this and wake up the blocked task.

In one embodiment of the present disclosure, to ensure that operations are serializable, the implementation follows the two phase locking protocol (2PL) when acquiring locks during a task. To ensure that operations do not induce a deadlock, they follow a least common ancestor-based locking protocol. Any task that acquires a lock l while holdings locks L must be holding the least common ancestor of l with all the locks in L. This suffices to ensure that deadlock cannot occur.

Hadoop Interop

The Hadoop-interop layer of M3R wraps a JobConf and produces an X10 job that can be run by the core M3R engine. The main job class distributes task specific data to each place when it is created. It then wraps the required Hadoop API-based user code for the engine and wraps the engine's context objects to present to the Hadoop API-based user code.

The compatibility layer is complicated by the need to support two sets of Hadoop APIs: the older mapred and the newer mapreduce interfaces. Since many classes (such as Map) do not share a common type, separate wrapper code is written for both of them. The implementation supports any combination of old (mapred) and new (mapreduce) style mapper, combiner, and reducer. It also support "map-only" jobs, which are Hadoop jobs with zero reducers. Output from the mapper is sent directly to output as per Hadoop.

M3R also supports many auxiliary features of Hadoop, including counters and the distributed cache. In addition to correctly propagating user counters, M3R keeps many Hadoop system counters properly updated. M3R also supports many Hadoop administrative interfaces including job queues, job end notification urls, and asynchronous progress and counter updates.

M3R may be run in the following ways: integrated mode and server mode. Integrated mode starts the Hadoop client under the control of M3R. M3R starts and initializes the X10 runtime across all of the designated machines and (using Java classpath trickery) replaces Hadoop's JobClient with a custom M3R implementation that submits jobs directly to the M3R engine. It then uses reflection to call the specified client main function. When the client submits jobs they are transparently redirected to the engine. If an (M3R-aware) client explicitly wishes to use Hadoop for a specific job, they can set a property in the submitted job configuration and the JobClient submission logic will invoke a Hadoop server as usual. Benchmarks are presented below that ran M3R in this integrated mode.

M3R also supports a server mode. In this mode, M3R starts up and registers an interprocess communication (IPC) server that implements the Hadoop JobTracker protocol. Clients can submit jobs as usual, and the M3R server (which functions just like the normal Hadoop server) will run the job. It is possible to simply replace the Hadoop server daemon with the M3R one. It is also possible to start the Hadoop and M3R servers with different configuration files that specify different ports. They can then coexist, and a client can dynamically choose which server to submit a job to by altering the appropriate port setting in their job configuration.

Using server mode, BigSheets, a large Hadoop based system that generates assorted jobs (many of them Pig jobs) were successfully run. The BigSheets system was unmodified, except that Hadoop server was stopped and the M3R server started on the same port.

Evaluation

The performance of the M3R implementation in one embodiment was tested by measuring the total running time of several benchmark programs. Each was written to the Hadoop API, with M3R-specific additions discussed above. These Hadoop programs were run in both the standard Hadoop engine and in the present disclosure's M3R engine, on the same input from HDFS, and verified that they produced equivalent output in HDFS (up to floating point rounding error). The hardware used was a 20 node cluster of 16 IBM LS-22 blades connected by Gigabit Ethernet. Each node has 2 quad-core AMD 2.3 Ghz Opteron processors, 16 GB of memory, and is running Red Hat Enterprise Linux 6.2. The JVM used is IBM J9 1.6.0. When running M3R on this cluster, one process per host was used, using 8 worker threads to exploit the 8 cores.

Microbenchmark

Figure 5:
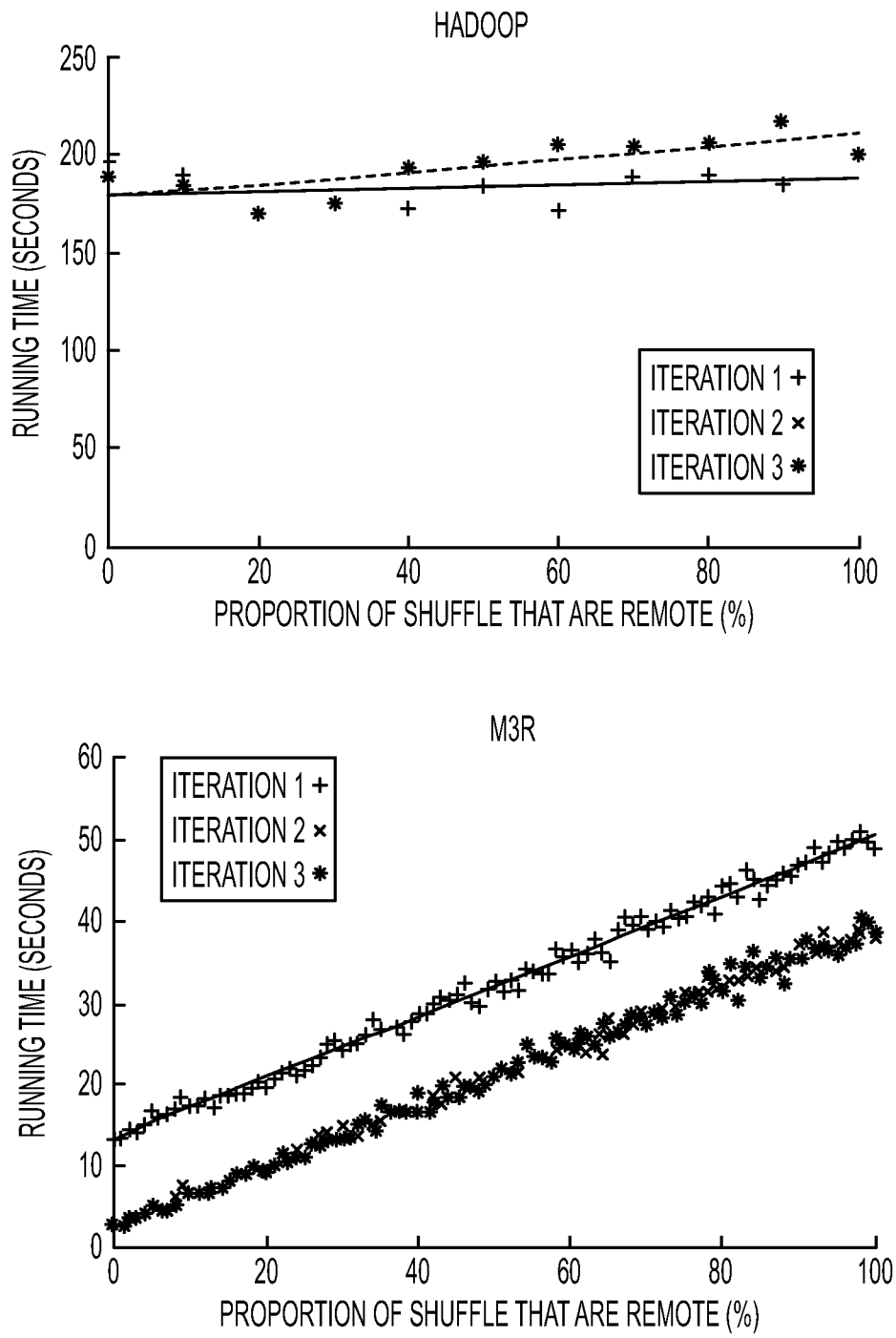
FIG. 5 illustrates performance profiles of microbenchmark in Haddop and M3R.

To illustrate these aspects of the present disclosure's performance model, an Hadoop application was written that is parameterized to simulate an arbitrary ratio of remote/local shuffling. Randomly, weighted by this local/remote ratio, pairs are either kept local or sent to an adjacent machine (thus requiring serialization and network overhead). The benchmark has three iterations, with the output of one job being the input for the next. The results are shown in FIG. 5.

The input to this job is 1 million pairs, each with an ascending integer for key and an array of 10000 bytes for value. The mapper, which implements ImmutableOutput, randomly decides to emit the pair with either its key unchanged or replaced with a key (created during the mapper's setup phase) that partitions to a remote host. The partitioner simply mods the integer key, and the reducer is the identity reducer.

In M3R, the output of all jobs except the final iteration is marked as temporary (not written to HDFS). The initial read and the final output is written to HDFS. The previous iteration's input is explicitly deleted, as it will not be accessed again and its presence in the cache wastes memory.

When running in Hadoop, every iteration takes the same amount of time, regardless of whether pairs are shuffled remotely or locally. This is because Hadoop does not provide a notion of remote/local shuffle because there is no partition stability. All shuffled data is serialized and communicated via local files and network and therefore there is equal cost for all destinations. Also, since Hadoop does not cache data between jobs, disk I/O occurs at the beginning and end of every job. The second and subsequent iterations cannot benefit from I/O performed by the first iteration, as the loaded data is not kept in memory between jobs.

When running in M3R, the performance changes drastically according to the amount of remote shuffling and due to cache hits in second and subsequent iterations. All iterations exhibit a linear relationship between the amount of remote shuffling required and the time taken, while also having a constant overhead. However the constant overhead is considerably less in the second and third iterations since pairs are fetched directly from the cache instead of being de-serialized from HDFS. Note also that in M3R, even the first iteration with 100% remote shuffles outperforms Hadoop by a considerable margin. This may be due to overheads inherent in Hadoop's task polling model, disk-based out-of-core shuffling, and JVM startup/tear down costs.

Repartitioning

To compare correctness with a pure stock Hadoop run, input data was generated with Hadoop (using the same Partitioner logic as the benchmark). The same data was used for both Hadoop runs of the microbenchmark and the present disclosure's M3R runs. This presents a challenge since although the pairs are subject to the same partitioner in M3R and Hadoop, the assignment of partitions to hosts is very different. M3R assigns partitions to hosts in a fixed manner, whereas Hadoop uses a dynamic approach. The host on which a given partition's data is stored is thus arbitrary, because it was written by the generator's reducer, which ran in Hadoop.

In M3R, M3R runs mappers on every host and a mapper is assigned, in the typical case, a local input split. This may not be the correct input split according to the partition/host mapping implied by partition stability, and thus pairs that are emitted with keys unmodified may end up being shuffled remotely. To avoid this, a 'repartitioner' job is run ahead of time, in M3R, using the identity mapper and reducer. This redistributes the HDFS storage of the data, using the shuffle, according to the M3R assignment of partitions to hosts. For the data described, this takes 83 seconds. This is a one-off cost, as the reorganized data can be used for any job, in any run of the benchmark subsequent to this.

A technique may be used to avoid this extra step when bringing Hadoop-output data into M3R. In the common case where the input data is partitioned along the same lines, but merely permuted across the hosts, HDFS remote reads could be used to bring the data into the correct mapper. The data would be cached in the right place so the cost would be only for the first iteration. This may be implemented using the PlacedSplit API, to override M3R's preference of local splits. Additionally, if the data is evenly distributed, it may be possible to take the permutation forced on M3R by Hadoop's assignment of partitions to hosts, and re-use it, keeping those partitions stable throughout the M3R execution. This would avoid all network overhead. In general, however, the data might be partitioned completely differently, e.g., if the Hadoop job that produced the data had a different number of reducers than the M3R job. In these cases, a full repartition job may be needed, to re-arrange the data on a pair-by-pair basis.

Sparse Matrix Dense Vector Multiply

The following discusses in detail the sparse vector multiply algorithm referred to above. The sparse matrix G is blocked into 1000×1000 blocks, using a custom key class that encapsulates a pair of ints as a two-dimensional index into the matrix. The value of such pairs is a compressed sparse column (CSC) representation of the sparse block. The dense vector V is blocked into 1000×1 blocks. The same key type is used (with a redundant column value of 0) and each value is an array of double. When generating data, a sparsity value of 0.001 is used for the sparse matrix. The generation is done by a Hadoop program, and a repartitioning job is used to reorganise the data as described above. The pairs are partitioned using the row index. This means that a given partition will contain a number of rows of G and matching blocks of V.

The algorithm consists of three iterations of calculating a new V from G and the previous V. Each iteration requires two jobs. The first job has a mapper for each of its G and V inputs. The G mapper simply passes through each G block, whereas the V mapper broadcasts each V block to every index of G that needs to be multiplied by it (i.e., a whole column). The reducer receives each block of G and associated V and multiplies them. This yields a partial result of the corresponding new V block, keyed by the index of the G block that was used. To sum the results of a row of G, the second job collects them by using its map logic to rewrite the keys to have column 0. A single reduce call therefore receives all partial sums and can compute the new V block, keyed by the row number and 0.

Figure 6:
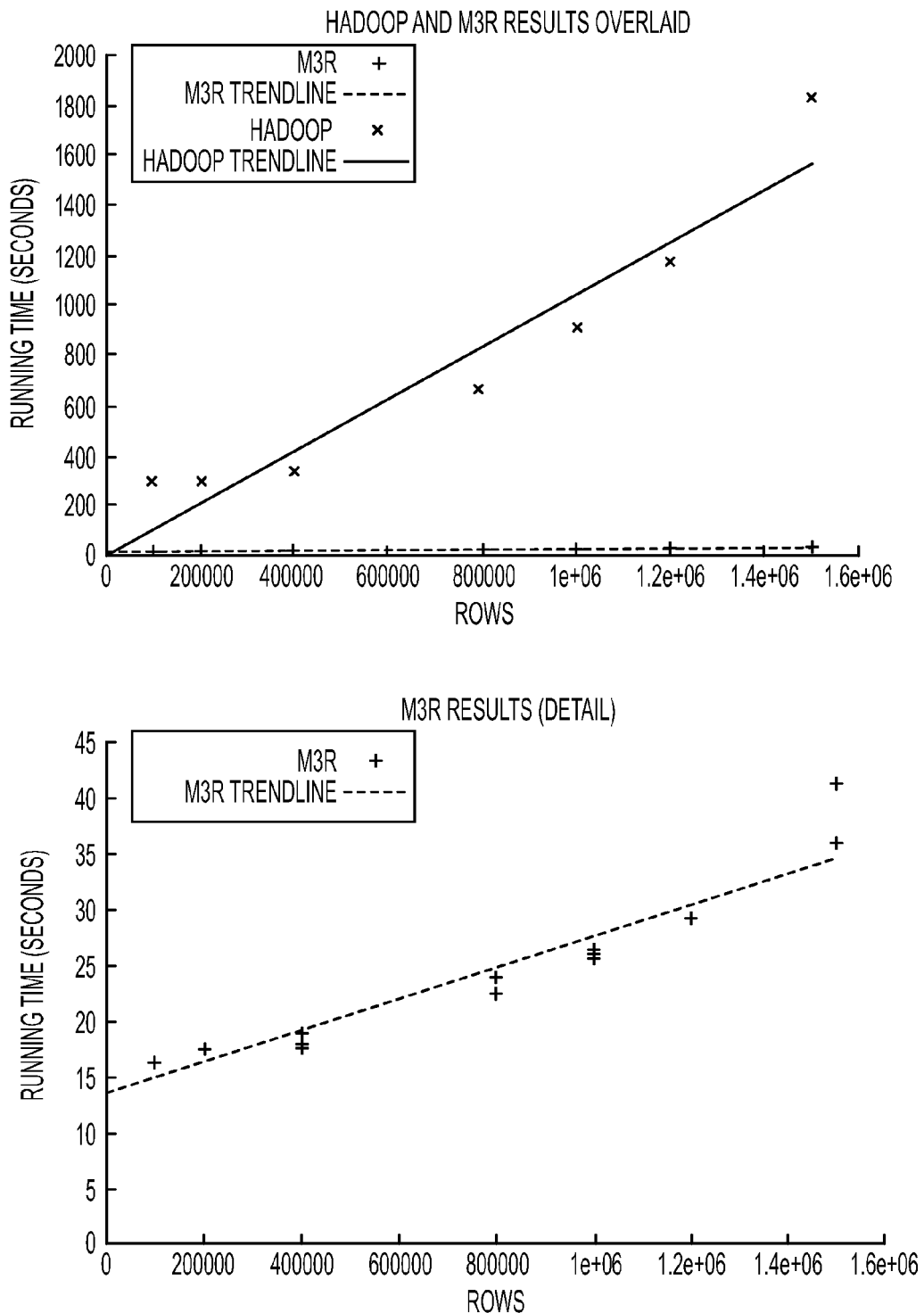
FIG. 6 illustrates performance profile of examples of sparse matrix dense vector multiply performed in Hadoop and M3R.

All mappers and reducers are marked with ImmutableOutput to allow the M3R engine to use aliases wherever possible. Aside from the initial load, the only disk or network I/O performed is during the shuffle phase of the first job of each iteration, where the V blocks are broadcast so that every host has a complete V with which to multiply against its row of G. All communication that was not inherent to the multiplication operation, given the partitioning scheme chosen, has been eliminated. In order to make the application more representative of a real machine-learning algorithm, which would use many more than three iterations, the cache of the present disclosure was pre-populated with the input data. This means that the initial I/O overhead (which if there were more iterations would be amortized across them) is not measured. FIG. 6 shows the comparison between M3R and Hadoop in sparse matrix dense vector multiply. The right hand graph shows just the M3R data, so its scalability is visible.

Word Count

Word count (Map Reduce's "Hello World") is an interesting case since none of M3R's optimizations apply. It is not an iterative job, so the cache does not come into play. It does not make use of partition stability. The vast majority of its shuffled pairs are remote. In the present disclosure, the standard code was modified to not mutate its pairs, and added the ImmutableOutput annotation to mapper and reducer. This means the instance of the performance profile is on the 100% end of the Iteration 1 line in FIG. 5. However, such great performance improvement over the HMR engine is not expected since that microbenchmark did not do any work on the keys, it only measured communication costs.

Figure 7:
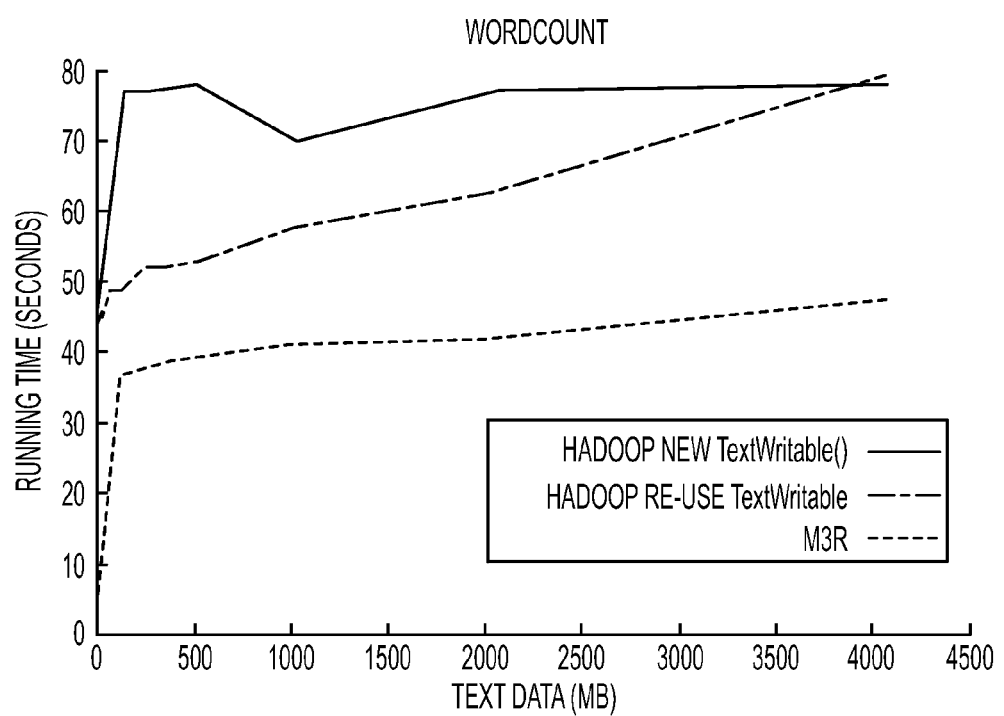
FIG. 7 illustrates performance profile of an example of wordcount performance.

FIG. 7 shows word count performance and shows that the M3R engine is approximately twice as fast as HMR engine for these input sizes. Greater input sizes would still fit in the memory of these machines, but the M3R shuffle implementation has memory overhead when large numbers of small pairs are used. The de-duplication may need an IdentityHashmap of all keys/values sent from a particular JVM. This may be addressed by relaxing X10 de-duplication to only check consecutive key/value pairs from the same mapper. This still allows the broadcast idiom of emitting pairs in a loop and does not require such a heavy-weight implementation.

Also shown in FIG. 7 is the performance cost of the modification to WordCount to allow use of ImmutableOutput. The version that allocates new TextWritable objects, and therefore can be annotated with ImmutableOutput, is subject to more memory pressure and GC churn. It is slower for small input sizes, but the gap disappears as the size increases.

System ML

System ML is an R-like declarative domain specific language that permits matrix-heavy algorithms for machine learning to be written concisely and elegantly. The System ML compiler produces optimized Hadoop jobs. System ML is of interest in M3R benchmarking since it allows to compare the performance of compiler-generated Map/Reduce code on M3R against Hadoop. More generally, System ML offers a simple and convenient way to benchmark the performance of multiple Map Reduce implementations on standard Machine Learning algorithms.

Two minor changes (involving changes to a few lines of code) were made to the System ML compiler and runtime: (1) System ML modified some Hadoop classes to fix bugs. Modifications made to the SystemML version were ported to these classes; (2) The System ML runtime directly accessed some files in HDFS; these were to be modified to be M3R cache-aware. Since the file API is based on byte buffers, and the cache stores key-value pairs, these calls were not trapped automatically. However, the System ML runtime immediately deserializes the data into key value pairs, the files were patched to retrieve the pairs from the cache directly.

No modifications were made to the System ML compiler optimization algorithms. In particular, the code generated by the compiler is not aware of ImmutableOutput (hence is not optimized for cloning), and does not take advantage of partition-stability. The in-memory representation for sparse matrix blocks in the System ML runtime is about 10× less space-efficient than in the sparse matrix multiply code that was written manually according to the present disclosure. These factors are not important for SystemML code run on Hadoop, but make a big difference in M3R. Thus, with appropriate modifications to the System ML compiler, much better numbers can be obtained on M3R, without compromising the numbers obtained on Hadoop.

Performance results from three iterative matrix-based System ML programs are presented. The matrices had a sparsity factor of 0.001 and were distributed with a blocking factor of 1000. (Note that System ML is capable of handling matrices with much larger sizes than the ones presented here.)

Figure 8:
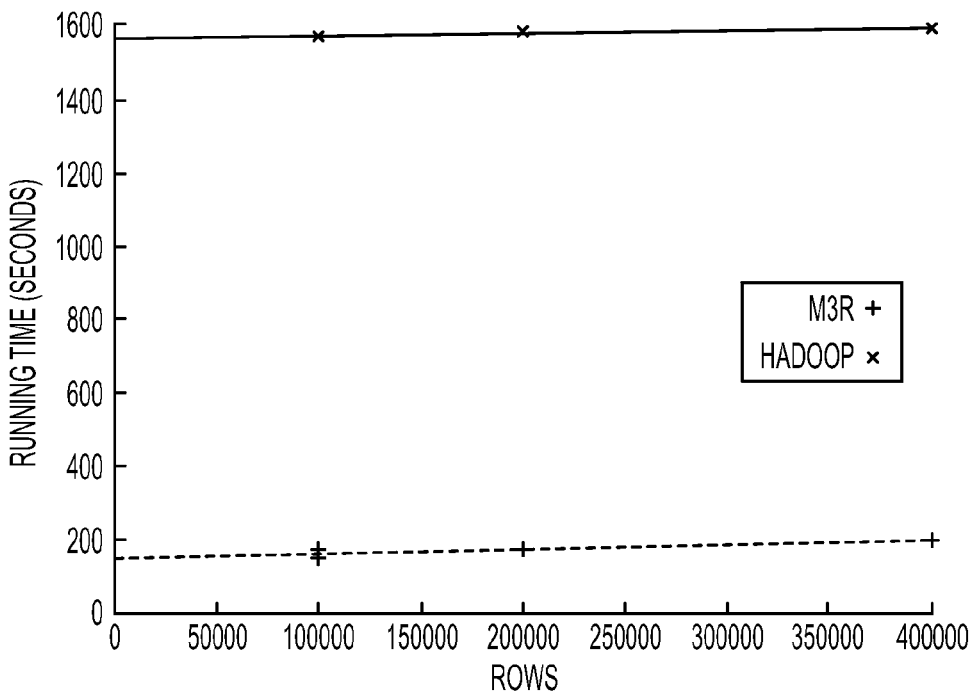
FIG. 8 illustrates performance profiles for system ML on Hadoop and M3R performing example global non-negative matrix factorization.
Figure 9:
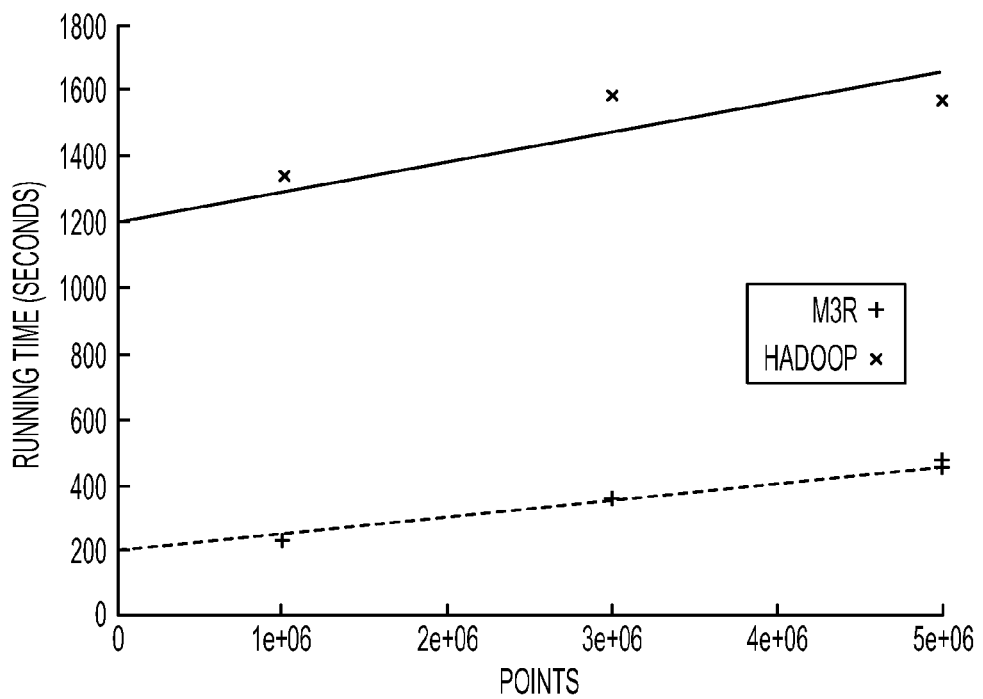
FIG. 9 illustrates performance profiles for system ML on Hadoop and M3R performing example linear regression.
Figure 10:
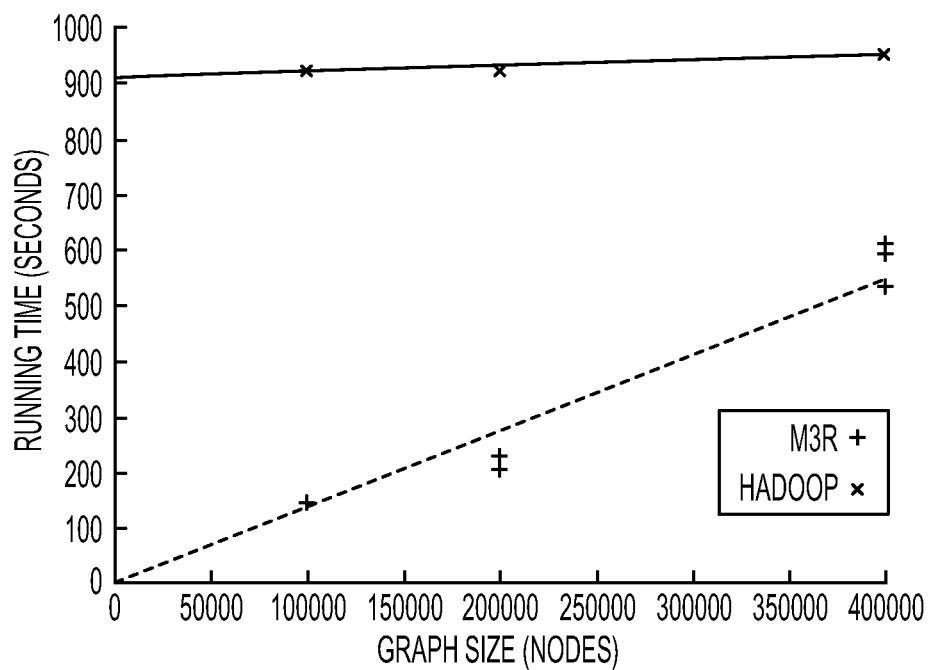
FIG. 10 illustrates performance profiles for system ML on Hadoop and M3R performing example page rank.

Global non-negative matrix factorization performance is shown in FIG. 8. The experiment varied the number of rows in V, keeping the number of columns constant at 100000, and the width of W (height of H) was 10. Linear regression performance is shown in FIG. 9. The experiment varied the number of sample points, whereas the number of variables was constant at 10000. Page rank performance is shown in FIG. 10. The independent variable in this case was the size of the graph, i.e., the size of the square matrix G.

An engine referred to as a M3R engine for Hadoop Map Reduce jobs are presented that in one embodiment utilizes in-memory, non-resilient execution and is able to deliver substantially better performance than Hadoop on jobs that can fit in cluster memory. In addition, libraries of Map Reduce code may be developed, e.g., libraries for sparse matrix vector computations, that can run on the HMR engine (scaling to the size of cluster disks), while delivering very good performance for jobs that can fit in the size of cluster memory. Further, X10-based M3R style engines (not necessarily based on Map Reduce) may be developed to provide fast in-memory performance for other APIs, such as APIs for sparse graphs, matrices, tables, etc. The M3R engine may be extended so that it can support resilience and elasticity. To support resilience, M3R may be implemented to detect node failure and recover by performing work proportional to the work assigned to the failed node. This can be done in a more flexible way than that supported by HMR (which effectively checkpoints state to disk after every job). Similarly, M3R of the present disclosure may be extended to support elasticity—the ability to cope with a reduction or an increase in the number of places over which it is executing—without paying for it at the granularity of a single job as HMR does.

Figure 11:
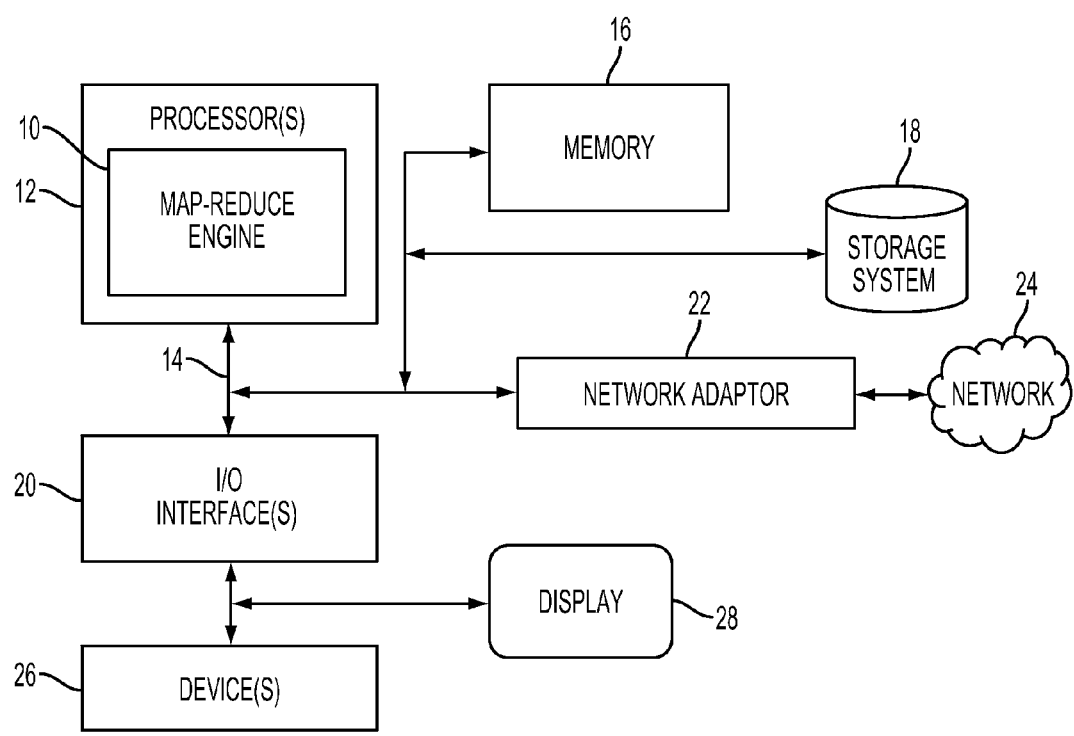
FIG. 11 illustrates a schematic of an example computer or processing system that may implement a map reduce execution system in one embodiment of the present disclosure.

FIG. 11 illustrates a schematic of an example computer or processing system that may implement a map reduce execution system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a map reduce engine module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for executing a map reduce sequence, comprising:
   a processor;
   a map reduce module operable to execute on the processor, and further operable to execute all jobs in the sequence by a collection of a plurality of processes with a process running one or more mappers, combiners, partitioners and reducers for a job respectively, the processes comprising virtual machine processes wherein at least one of the jobs comprises at least a mapper and a reducer run in a same virtual machine process; and
   an in-memory cache for transparently sharing of heap state between the jobs,
   wherein the map reduce module is further operable to coordinate completion of map, shuffle and reduce phases, and completion of said all jobs in the sequence, wherein for all of the mappers, a mapper has a tree map for each destination reducer associated with the mapper, the tree map storing data output by the mapper destined for said each destination reducer, and responsive to all of the mappers terminating, merging the tree map of each of the mappers into one tree for said each destination reducer by one or more of the combiners, the tree map buffered as a data structure in the in-memory cache.

2. The system of claim 1, wherein the in-memory cache comprises an association of input descriptors to an in-memory representation of a key value sequence obtained by running a corresponding input format descriptor on the input descriptor, and an association of output descriptors with the in-memory representation of the key value sequence consumed by the corresponding output format descriptor to produce the data associated with the output descriptor.

3. The system of claim 2, wherein reads from the input descriptor are fulfilled using the input format descriptor from the cached value associated with the input descriptor, and reads from the output descriptor are fulfilled using the input format descriptor by using the cached value associated with the output descriptor.

4. The system of claim 2, wherein a copy is made of the key value pairs emitted by the mapper before the key value pairs are added to the in-memory cache, unless it can be established that the mapper does not reuse the key value pair it has emitted.

5. The system of claim 4, wherein de-duplication is performed so that fewer copies of a key or value is sent from one of the processes to another one of the processes, regardless of a number of copies of the key or value intended to be sent from said one of the processes to said another one of the processes.

6. The system of claim 5, wherein the fewer copies of a key is one copy of the key.

7. The system of claim 2, wherein the key value pairs are transmitted in the shuffle unless it can be established that the mapper does not reuse the key value pair it has emitted.

8. The system of claim 2, wherein a copy is made of the key value pairs emitted by the reducer before the key value pairs are added to the in-memory cache, unless it can be established that the reducer does not reuse the key value pair it has emitted.

9. The system of claim 2, wherein a copy is made of the key value pairs emitted by the combiner before the key value pairs are added to the in-memory cache, unless it can be established that the combiner does not reuse the key value pair it has emitted.

10. The system of claim 1, wherein key value pairs are shuffled in the in-memory cache between the mappers.

11. A non-transitory computer readable storage medium storing a program of instructions executable by a machine to perform a method of executing a map reduce sequence, the method comprising:

executing, by one or more processors, all jobs in the sequence by a collection of a plurality of processes with a process running one or more mappers, combiners, partitioners and reducers for a job respectively, and transparently sharing heap state between the jobs in an in-memory cache to improve metrics associated with the job, the processes comprising virtual machine processes wherein at least one of the jobs comprises at least a mapper and a reducer run in a same virtual machine process; and communicating among the processes to coordinate completion of map, shuffle and reduce phases, and completion of said all jobs in the sequence, wherein for all of the mappers, a mapper has a tree map for each destination reducer associated with the mapper, the tree map storing data output by the mapper destined for said each destination reducer, the tree map buffered as a data structure in the in-memory cache, and responsive to all of the mappers terminating, merging the tree map of each of the mappers into one tree for said each destination reducer by one or more of the combiners.

12. The computer readable storage medium of claim 11, wherein the transparently sharing of the heap state comprises employing the in-memory cache comprising an association of input descriptors to an in-memory representation of a key value sequence obtained by running a corresponding input format descriptor on the input descriptor, and an association of output descriptors with the in-memory representation of the key value sequence consumed by the corresponding output format descriptor to produce the data associated with the output descriptor.

13. The computer readable storage medium of claim 12, further comprising:
fulfilling reads from the input descriptor using the input format descriptor from the cached value associated with the input descriptor; and
fulfilling reads from the output descriptor using the input format descriptor by using the cached value associated with the output descriptor.

14. The computer readable storage medium of claim 12, wherein a copy is made of the key value pairs emitted by the mapper before the key value pairs are added to the cache, unless it can be established that the mapper does not reuse the key value pair it has emitted.

15. The computer readable storage medium of claim 14, further comprising:
performing de-duplication so that fewer copies of a key or value is sent from one of the processes to another one of the processes, regardless of a number of copies of the key or value intended to be sent from said one of the processes to said another one of the processes.

16. The computer readable storage medium of claim 14, wherein the fewer copies of a key is one copy of the key.

17. The computer readable storage medium of claim 14, wherein communication from one of the processes to another one of the processes occur in batches.

18. The computer readable storage medium of claim 12, wherein the key value pairs are transmitted in the shuffle, unless it can be established that the mapper does not reuse the key value pair it has emitted.

19. The computer readable storage medium of claim 12, wherein a copy is made of the key value pairs emitted by the reducer before the key value pairs are added to the cache, unless it can be established that the reducer does not reuse the key value pair it has emitted.

20. The computer readable storage medium of claim 12, wherein a copy is made of the key value pairs emitted by the combiner before the key value pairs are added to the cache, unless it can be established that the combiner does not reuse the key value pair it has emitted.

21. The computer readable storage medium of claim 11, further comprising:
shuffling key value pairs in the cache memory between the mappers.

22. A non-transitory computer readable storage medium storing a program of instructions executable by a machine to perform a method for executing a map reduce sequence, the method comprising:

executing, by one or more processors, all jobs in the sequence by a collection of a plurality of processes with a process running one or more mappers, combiners, partitioners and reducers for a job, the processes comprising virtual machine processes wherein at least one of the jobs comprises at least a mapper and a reducer run in a same virtual machine process;

employing an in-memory cache comprising an association of input descriptors to an in-memory representation of a key value sequence obtained by running a corresponding input format descriptor on the input descriptor, and an association of output descriptors with the in-memory representation of the key value sequence consumed by the corresponding output format descriptor to produce the data associated with the output descriptor, to enable transparently sharing heap state between the jobs; and communicating among the processes to coordinate completion of map, shuffle and reduce phases, and completion of said all jobs in the sequence, wherein for all of the mappers, a mapper has a tree map for each destination reducer associated with the mapper, the tree map storing data output by the mapper destined for said each destination reducer, the tree map buffered as a data structure in the in-memory cache, and responsive to all of the mappers terminating, merging the tree map of each of the mappers into one tree for said each destination reducer by one or more of the combiners.

* * * * *